United States Patent [19]

McCaskey, Jr. et al.

[11] 4,077,652
[45] Mar. 7, 1978

[54] PLASTIC SKI SURFACING SYSTEM

[75] Inventors: Harold O. McCaskey, Jr., Allendale, S.C.; Salvatore E. Palazzolo, Elizabeth City, N.C.

[73] Assignee: Westinghouse Electric Corporation, Pittsburgh, Pa.

[21] Appl. No.: 674,267

[22] Filed: Apr. 6, 1976

Related U.S. Application Data

[60] Division of Ser. No. 559,939, Mar. 19, 1975, Pat. No. 3,967,992, which is a continuation of Ser. No. 326,910, Jan. 26, 1973, abandoned.

[51] Int. Cl.² .................. A63C 5/00; B32B 27/08
[52] U.S. Cl. .................. 280/610; 428/220; 428/428; 428/425; 428/332; 428/433; 428/416; 428/438; 428/415; 428/442; 428/463; 428/464; 428/520; 428/537; 280/601
[58] Field of Search .............. 428/332, 520, 341, 425, 428/428, 442, 433, 438, 463, 464, 415, 537; 280/11.13 L, 11.13 R, 610, 601

[56] References Cited

U.S. PATENT DOCUMENTS

| | | | |
|---|---|---|---|
| 2,949,383 | 8/1960 | Blake | 428/520 X |
| 3,258,795 | 7/1966 | Mailhot | 280/610 X |
| 3,607,615 | 9/1971 | Hatakeyama et al. | 156/332 X |
| 3,635,482 | 1/1972 | Holman | 280/610 |
| 3,707,296 | 12/1972 | Palazzolo et al. | 280/610 |

FOREIGN PATENT DOCUMENTS 418,196    2/1967    Switzerland .................. 280/610

*Primary Examiner*—P. C. Ives
*Attorney, Agent, or Firm*—D. P. Cillo

[57] ABSTRACT

A snow ski is made by superimposing a protective assembly of polyacrylate sheets on a flexible core of a ski body having a bonded base surface and sidewall surfaces and then bonding the polyacrylate sheets to the ski core forming a top protective ski surface, the protective assembly being consolidated at a temperature and pressure effective to stress relieve the polyacrylate sheets.

8 Claims, 2 Drawing Figures

U.S. Patent  March 7, 1978  4,077,652
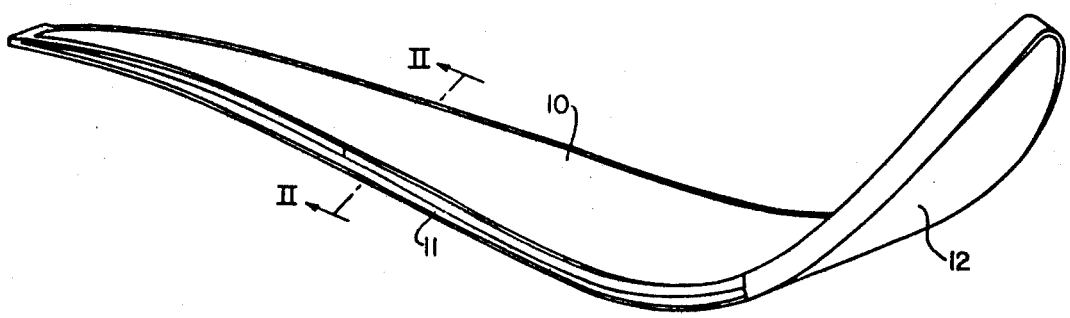
FIG.I.
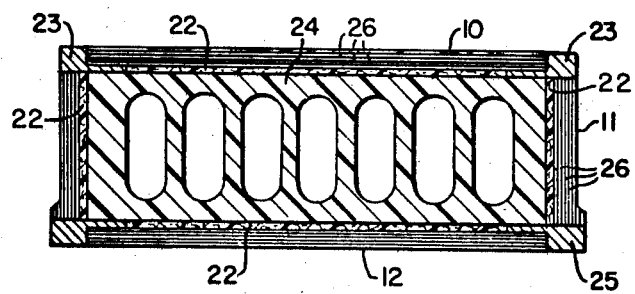
FIG.2.

PLASTIC SKI SURFACING SYSTEM

This is a divisional application of application Ser. No. 559,939 filed on Mar. 19, 1975 U.S. Pat. No. 3,967,992, which was a continuation of application Ser. No. 326,910, filed on Jan. 26, 1973, now abandoned.

BACKGROUND OF THE INVENTION

Acrylic films were marketed in 1967. These films exhibited high resistance to the effects of ultraviolet radiation, good retention of flexibility on exterior aging and outstanding resistance to yellowing under both heat and light exposure. The film was also resistant to common stains, such as lipstick and shoe polish, and mild acids and bases. The film was suggested as suitable for surfacing wood veneers and as a protective coating for exterior signs and siding, outdoor furniture and appliance parts.

Phenolic resin impregnated kraft paper sheets, melamie modified-phenolic resin impregnated kraft paper sheets, epoxy resin impregnated fiberglass sheets (U.S. Pat. No. 3,503,621), acrylonitrile butadiene styrene (ABS) sheets, polyethylene sheets (U.S. Pat. No. 3,498,626) and Dacron mat, have been used as top surface protective and decorative layers on metal framed snow skis. The advent of the high performance wood-fiberglass and fiberglass-plastic foam skis, however, has posed very serious problems for present ski surfacing systems, many of which are relatively brittle.

In most cases, the extreme flexibility of the high performance wood-fiberglass or fiberglass plastic foam ski, causes the plastic protective surface layer to crack or delaminate after strenuous use, such as ski jumping, where tremendous shear stress is placed on the ski tip, which tends to flatten upon impact.

Manufacturing problems associated with presently used top surface ski layers include poor bonding to the fiberglass reinforcing layer of ski core. This is caused, in part, by protective layer sheet shrinking or stress relieving in molding, and the inherent poor bonding properties of materials such as styrene acrylonitrile. Also, in many cases, after continuous flexing of the high performance ski, the plastic surface layer develops excessive stress whitening. There is a need then, for a material and method that will solve the above mentioned manufacturing problems, and provide a long life top surface for the new generation of high performance skis.

SUMMARY OF THE INVENTION

We have found that a stress relieved, polyacrylate protective layer can be molded to reinforcing of core layers of high performance skis, with excellent bonding and with superior resistance to delamination, cracking and stress whitening.

BRIEF DESCRIPTION OF THE DRAWINGS

For a better understanding of the invention, reference may be made to the exemplary embodiment shown in the accompanying drawings, in which:

FIG. 1 shows, in three dimensional view, a ski having the polyacrylate layer of this invention as the protective top and side wall ski surface; and FIG. 2 shows, in cross section, the ski of FIG. 1, including the top and sidewall laminations of reinforcing layers and polyacrylate top protective sheets.

DESCRIPTION OF THE PREFERRED EMBODIMENTS

Referring now to the drawings, FIG. 1 shows one type of high performance, metal-fiberglass snow ski, having the polyacrylate protective layer of this invention as the ski top surface 10 and sidewall 11.

FIG. 2 shows a cross sectional view of the ski shown in FIG. 1. A lamination of a plurality of polyacrylate sheets constitute the ski top surface layer 10 and sidewall layer 11.

Generally skis can be made by a sandwich construction wherein the top surface 10, sidewall 11 and bottom base 12 cover a reinforcing layer 22, which may comprise fiberglass or glass cloth laminates used alone or impregnated with epoxy or other suitable resin. On the sides of the reinforcing layers 22, are edge protector strips 23 and 25 of a metal, generally aluminum. The highly flexible core 24 of the ski is surrounded by the top surface layer, base layer, and sidewalls between the top surface and base.

The core 24, in high performance skis, can be, for example, a hollow plastic core of epoxy resin reinforced fiberglass, a lightweight epoxy or polyurethane foam core, an aluminum honeycomb core or a suitable, pressed, light-weight wood core. Generally, the lower fiberglass lamination is covered by a base layer 12 of polyethylene, fitted between hardened, continuous or cracked metal bottom edges 25.

The stress relieved protective surface layers of this invention comprise a plurality of bonded, laminated, polyacrylate sheets 26. The stress relieved layers 10 and 11 can be molded separately and then bonded, generally with an adhesive, to the core 24, without the use of the reinforcing layer 22. The stress relieved layers can be bonded to the reinforcing layer 22 in an initial molding step, after which the composite is bonded to the ski core with or without an adhesive. Or, the reinforcing layer can be placed on the ski core and the sheets of polyacrylate molded to it, and simultaneously stress relieved in situ.

The protective polyacrylate layers can be prepared from an assembly of a plurality of sheets, and heat and pressure consolidated together in the variety of ways described above, at pressures and temperatures effective to stress relieve the sheets, i.e. pressures between about 100–600 psi. (7–42 kg./sq. cm.) and temperatures between about 120°–165° C, preferably between 140°–160° C. The resulting laminated polyacrylate layer can be between about 4–45 mils (0.011–0.114 cm) thick, and is specially suitable as a ski surfacing material. It is critical that the polyacrylate sheets be heated to at least about 120° C, to cause the sheets to shrink at least about 2%, in order to relieve the shrinkage stresses inherent in the sheets from the manufacturing process. Heating between about 120° and 160° C causes the polyacrylate to become rubbery. Heating over about 165° C is undesirable, since it will cause the polyacrylate to flow under pressure. The polyacrylate used in this invention should have a weight average molecular weight above about 175,000 in order to withstand processing conditions.

The polyacrylate protective layers can then be superimposed upon and bonded to a ski core, at pressures between about 50–150 psi (3.5–10.5 kg/sq. cm.) and temperatures between about 120°–175° C, generally using a conventional adhesive such as an epoxy to help bond the decorative protective layers to the core. A suitable resin finish coating, up to about 10 mils thick, can be applied to the decorative protective layer as a final step to provide a high sheen and polished surface.

In molding a ski, a mold cavity having the outside configuration of the bottom ski surface, and the proper ski camber is used. Generally, the bottom ski surface layer is placed in the mold, a fiberglass mat and edge protector are superimposed, epoxy resin is introduced to impregnate the fiberglass mat, and an inner mold member is moved into the cavity under heat and pressure. The upper ski surface is formed in a similar manner. The cavity in the bottom ski mold may then be filled with a suitable plastic foam or other core material, and the upper ski surface and side-walls bonded to the core-filled, bottom ski surface under heat and pressure, generally using a suitable adhesive.

Acrylic plastics are made by free radical catalysts acting on monomeric methyl methacrylate. They are rigid thermoplastics made from upwards of 90 percent methyl methacrylate, i.e. over 90% methyl methacrylate the remainder being an ester of acrylic or methacrylic acid. Most molding compositions using these methyl methacrylate containing thermoplastics are co-polymers of methyl methacrylate, with 1 to 12 percent of ethyl acrylate as a modifier to provide increased flow in molding. The all-acrylic resins range from soft gums, such as polymers of ethyl acrylate or octyl methacrylate, through flexible materials such as a polybutyl methacrylate to rigid polymethyl methacrylate. By co-polymerization of various acrylic monomers, an essentially continuous range of softness and solubility is obtainable.

Casting and extrusion are the two basic methods of producing acrylic sheet. In extrusion, the sheet is produced from solid acrylic polymers by a melt process through a die. In casting, the sheet is produced from catalyzed monomer, or a syrup of partially polymerized monomer, which may be poured into cells made from two sheets of glass with a compressible gasket around the edge. The stock is cured in ovens or a water bath, usually followed by further heating at about 100° C to complete the polymerization. At this point there are substantial shrinkage strains inherent in the sheet material. To increase melt flow in thermoforming, up to about 10 percent by weight of a plasticizer such as dioctyl phthalate, dibutyl phthalate, polyethylene glycols or alkyl acrylates, such as ethyl acrylate, may be incorporated in the monomer. The acrylic sheet may also be continuously cast where the chemical reaction of the blend of monomer and catalyst is controlled to result in rapid cure.

Acrylic sheet is commercially available, for example, under the tradenames Korad A and Korad C, in clear or colored form, in thicknesses from about 1 to 12 mils, from Rohm and Haas Company. Korad A is believed to consist of poly(methyl methacrylate) modified with ethyl acrylate comonomer. Its number average molecular weight ($\overline{Mn}$) is approximately 59,000 and its weight average molecular weight ($\overline{Mw}$) is approximately 260,000 with a polydispersity ratio ($\overline{Mw}/\overline{Mn}$) of 4.43. Korad C is believed to consist of high molecular weight methyl methacrylate homopolymers with a small amount of low molecular weight plasticizer. Its number average molecular weight ($\overline{Mn}$) is approximately 308,000 and its weight average molecular weight ($\overline{Mw}$) is approximately 654,000 with a polydispersity ratio ($\overline{Mw}/\overline{Mn}$) of 2.13. These sheets have a dimensional stability of about 2% shrinkage at about 120° C and continue to about 15% shrinkage at about 165° C.

EXAMPLE 1

An assembly of four sheets of 6 mil thick, black acrylic sheet having a weight average molecular weight of about 260,000 (sold by Rohm and Haas Company under the tradename Korad A) was placed in a press and molded against a chrome polished steel pressing plate at 350 psi, with a platen temperature of 140° C, for a total of four minutes to form a laminate. The poly(methyl methacrylate) laminate was stress relieved i.e. shrunk about 3 to 4% due to the high temperature laminating, and was allowed to cool to 60° C, after which it was removed from the press.

The laminate, which was about 24 mils thick, was cut to conform with a ski top surface. This top layer laminate was superimposed on and molded directly to the ski core, of a partially assembled ski, under fabricating conditions of 154° C and approximately 100 psi, in a standard ski molding press using a conventional epoxy adhesive. When cooled and removed from the press, the poly(methyl methacrylate) top protective surface layer was sanded smooth and decoratively finished by a silk screening technique. A clear protective coating of urethane plastic, about 3 mils thick, was then applied.

The assembled ski was tested for flex, impact and general performance characteristics, which were found to be excellent. No stress whitening was observed from continuous flexing of the ski. No measurable deleterious effect on camber was observed and the polyacrylate surface was extraordinarily well bonded to the ski core. We found that the polyacrylate protective layer also provided a refinishable ski surface. Most kraft paper or fiberglass base ski surfaces upon refinishing show laminations within the laminate as objectionable lines. The polyacrylate layer could be sanded and decoratively finished, without such objectionable lines, with relative ease.

The excellent bonding during ski molding, with resulting lack of cracking and delamination under severe impact and flex, was attributed to the excellent bonding, characteristics of the poly(methyl methacrylate) film itself, and the high temperature molding operation, which stress relieved the shrinking properties inherent in the polyacrylate sheets. The stress relieved polyacrylate surface of this invention was also found to be less resistant to cracking, when used on metal framed snow skis, due to temperature variations and low temperatures that would be encountered during skiing, than most prior art protective layers.

Polyethylene and acrylonitrile-butadiene-styrene (ABS) protective layer sheets tend to melt and flow at pressures and temperatures necessary to provide good integral bonding to the ski core. Phenolic, modified phenolic, and epoxy resin based materials provide integral bonding without melt and flow, but they are relatively brittle and unable to withstand the stresses caused by the extreme ski flexing involved, for example, in competition skiing. Withstanding these stresses is a prerequisite in the ultimate embodiment of modern high-performance skis.

EXAMPLE 2

Simulating direct bonding to the ski, a composite laminate was molded as in EXAMPLE 1 except that the 24 mil thick poly(methyl methacrylate) layer was molded to a 6-8 mil thick epoxy impregnated glass cloth layer at 350 psi and 140° C. The polyacrylate-epoxy glass cloth composite had excellent integrity, the polyacrylate layer having virtually encapsulated the glass cloth reinforcing sheet. This provided, on cooling, a high pressure stress relieved polyacrylate-glass cloth reinforced construction, which could be cut to size and bonded separately to a ski at lower pressures, or bonded in situ during the fabrication of the ski body. Similar results were observed substituting Korad C for the Korad A sheet material.

We claim:

1. A ski resistant to delamination comprising a flexible core surrounded by and bonded to a top surface, base surface, and side wall surfaces between the top surface and base surface, wherein the top surface comprises a refinishable, molded layer of a plurality of laminated stress relieved polyacrylate sheets having weight average molecular weights of between about 260,000 and about 654,000 and consisting essentially of poly(methyl methacrylate), said sheets having been stress relieved, by laminating them together at between about 100 psi to 600 psi and about 120° to 165° C, causing the sheets to shrink between about 2–15%.

2. The ski of claim 1 wherein the polyacrylate sheets are laminated together without flow under pressure, and the stress relieved sheets are selected from the group consisting of cast polyacrylate and extruded polyacrylate.

3. The ski of claim 1 wherein the top surface is a poly(methyl methacrylate) layer between about 4–45 mils thick.

4. The ski of claim 1 wherein the side wall surface is a poly(methyl methacrylate) layer.

5. The ski of claim 1, wherein the polyacrylate consists essentially of poly(methyl methacrylate) modified with ethyl acrylate.

6. The ski of claim 3, wherein the top surface is stress relieved by laminating at between about 100–600 psi and about 120°–165° C and cooling, before bonding to the ski core.

7. The ski of claim 3 wherein the top surface is bonded to a reinforcing layer comprising resin impregnated glass fibers, said reinforcing layer disposed between the top surface and ski core.

8. The ski of claim 3 coated with a protective resin coating about 1–10 mils thick.

* * * * *